(12) United States Patent
Jenrich et al.

(10) Patent No.: US 8,932,074 B2
(45) Date of Patent: Jan. 13, 2015

(54) CONTACT MAKING ARRANGEMENT FOR CONDUCTORS PROVIDED ON FLAT STRUCTURES, NAMELY PANES OF GLASS

(75) Inventors: André Jenrich, Leipzig (DE); Roy Gleisberg, Markranstädt (DE)

(73) Assignee: Few Fahrzeugelektrikwerk GmbH & Co. KG, Zwickau (DE)

( * ) Notice: Subject to any disclaimer, the term of this patent is extended or adjusted under 35 U.S.C. 154(b) by 0 days.

(21) Appl. No.: 13/885,814

(22) PCT Filed: Nov. 9, 2011

(86) PCT No.: PCT/EP2011/069759
§ 371 (c)(1),
(2), (4) Date: Jun. 13, 2013

(87) PCT Pub. No.: WO2012/065893
PCT Pub. Date: May 24, 2012

(65) Prior Publication Data
US 2013/0269990 A1    Oct. 17, 2013

(30) Foreign Application Priority Data
Nov. 17, 2010  (DE) .......................... 10 2010 051 670

(51) Int. Cl.
*H01R 13/62*   (2006.01)
*H01R 4/04*    (2006.01)
*B32B 17/06*   (2006.01)

(52) U.S. Cl.
CPC ............... *H01R 4/04* (2013.01); *B32B 17/061* (2013.01); *H05B 2203/016* (2013.01); *Y10S 439/916* (2013.01); *Y10S 439/919* (2013.01); *Y10S 439/936* (2013.01)
USPC ............ 439/371; 439/916; 439/919; 439/936

(58) Field of Classification Search
CPC ........................................................ H01R 4/04
USPC .................................. 439/371, 916, 919, 936
See application file for complete search history.

(56) References Cited

U.S. PATENT DOCUMENTS 3,627,981 A * 12/1971 Kuhn ............................ 219/212
3,794,953 A    2/1974 Malin
(Continued)

FOREIGN PATENT DOCUMENTS

DE    10 2010 018 860    11/2011
FR         2 893 189      5/2007

*Primary Examiner* — James Harvey
(74) *Attorney, Agent, or Firm* — Hamre, Schumann, Mueller & Larson, P.C.

(57) ABSTRACT

The invention relates to a contacting arrangement for conductors provided on flat structures, namely glass panes, the conductors having a contact point in their connecting section, wherein one end of a connecting cable or another connection device is electrically and mechanically connected with a pad including a conductive fleece or double-sided conductive adhesive tape, wherein the connecting cable configured in this way is introduced into an encasement block which is open at one side and which includes a frame which surrounds the fleece or the conductive adhesive tape and which is provided with adhesive, wherein the surface of the conductive fleece which is laterally defined by the frame is matched to the area of the contact point in order to provide a contact connection between the contact point and the fleece surface through an adhesive joint between the frame and the flat structure, wherein the frame with the encasement element closes off the contact point in sealing fashion towards the ambient and a portion of the frame is usable as a sealing lip for preventing adhesives from spreading out when the glass pane is fitted.

7 Claims, 4 Drawing Sheets

(56) References Cited

U.S. PATENT DOCUMENTS

| | | | |
|---|---|---|---|
| 4,385,588 A * | 5/1983 | Bennetot | 118/638 |
| 5,265,329 A * | 11/1993 | Jones et al. | 29/832 |
| 5,842,873 A * | 12/1998 | Gonzales | 439/63 |
| 6,164,984 A * | 12/2000 | Schreiner | 439/86 |
| 6,840,780 B1 | 1/2005 | Antaya et al. | |
| 7,270,548 B2 * | 9/2007 | Jenrich et al. | 439/34 |
| 2004/0067684 A1 * | 4/2004 | Mueller et al. | 439/578 |
| 2008/0210679 A1 * | 9/2008 | Raidt et al. | 219/213 |
| 2010/0212828 A1 * | 8/2010 | Buck et al. | 156/305 |
| 2013/0037296 A1 * | 2/2013 | Jenrich | 174/50 |
| 2013/0045647 A1 * | 2/2013 | Jenrich et al. | 439/884 |
| 2013/0269990 A1 * | 10/2013 | Jenrich et al. | 174/255 |

* cited by examiner

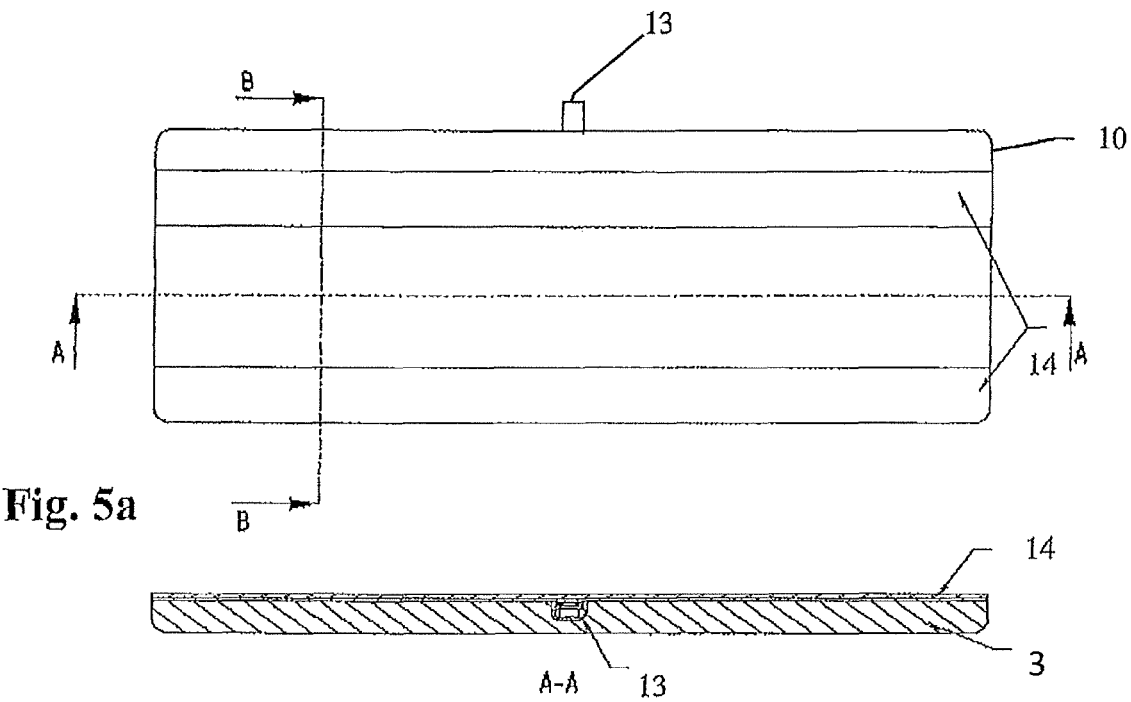
Fig. 5a
Fig. 5b
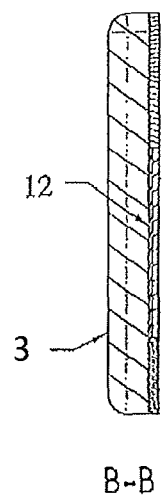
Fig. 5c

CONTACT MAKING ARRANGEMENT FOR CONDUCTORS PROVIDED ON FLAT STRUCTURES, NAMELY PANES OF GLASS

FIELD OF THE INVENTION

The invention relates to a contact arrangement for conductors provided on flat structures, namely glass panes, wherein the conductors include a contact point in their connecting sections.

BACKGROUND

In order to contact conductors provided on flat structures, namely glass panes, e.g. conductors which are configured as heating conductors for a rear window or as antenna conductors, it is known to use soldering processes.

During soldering, however, a thermal loading of the glass pane is provided which shall be avoided as a matter of principle, in particular when a plurality of solder joints has to be provided. A punctiform introduction of rather high amounts of heat constitutes a particular problem.

A de-soldering process has to be performed when there are incorrect connections which in turn can lead to stress fractures in the glass material.

Finished solder joints are furthermore externally visible so that subsequent blackening has to be performed in particular applications.

Additionally, standard soldering methods use soldering materials which include a certain amount of lead which causes environmental problems.

According to current technology, window panes for motor vehicles are not inserted into a vehicle body through a circumferential profile anymore but are connected at gluing surfaces. In window panes of this type, a dividing element in the form of a sealing cushion or a sealing lip is being used. The function of the sealing cushion or the sealing lip provides that the glue which is applied to the window pane for installing the window pane into the vehicle body does not move into the vision area of the window pane and does not come in contact with conductive imprints disposed on the window pane.

Thus, it is an object of the invention to provide an improved contacting arrangement for conductors provided on flat structures, in particular glass panes, wherein the contacting arrangement omits thermal soldering processes and wherein eventually a processing can be performed without technical prerequisites of a laser soldering device.

SUMMARY OF THE INVENTION

A contacting arrangement is provided for conductors that are provided on flat structures, in particular glass panes, wherein the conductors include a contact point in their connecting sections, wherein the contact point is provided for example in the form of an imprinted conductive surface.

The contacting arrangement shall for example provide an electrical connection for an antenna or a power supply for a heating conductor and shall include sufficient power carrying capability for this purpose.

According to the invention, an end of a connecting cable or of a connecting plug is electrically and mechanically connected with a pad made from a conductive fleece or double sided conductive tape. The arrangement thus configured is inserted into an encasement block that is open on one side and which includes a frame that envelops the fleece and is provided with glue or which is self-adhesive.

According to the invention, a portion of the frame can be used as a sealing lip for preventing the spreading of glue materials when mounting the window pane and the sealing lip can thus be integrated into the encasement mold.

Furthermore, the surface of the conductive fleece that is laterally defined by the frame is adapted to the surface of the contact point on the flat structure in order to provide a contact through surface pressure between the contact point and the conductive adhesive tape or fleece surface through a glue joint between the frame and the flat structure, wherein the frame with encasement element closes the contact point towards an outside.

In one embodiment, the end of the connecting cable is connected with a conductive foil on which the pad, in this case made from conductive fleece that is coated with adhesive on both sides, is provided.

In order to improve the contacting through reducing electrical resistance, the conductive fleece can be made from plural layers.

Thus, plural cross-over layers can be provided. The conductive fleece has elastic properties so that a respective contact safety is provided when the encasement element with the gluing frame is applied to the contact point of the flat structure. Preferably the thickness of the conductive fleece material is greater than a height of the frame of the encasement element or the conductive fleece protrudes beyond the surface of the frame.

In one embodiment of the invention, the encasement block can be colored in order to optically conceal the contact point.

As stated supra, the frame has self-adhesive properties in a preferred embodiment and is covered with a protective material before being glued together with the flat structure.

The protective material can cover the entire surface that is defined by the frame; this means also the surface below which the fleece pad is arranged. Thus, the contacting arrangement can be prefabricated and stored without providing a contamination of the fleece pad and/or an impairment of the gluing properties of the frame.

In a preferred embodiment, the encasement element has a band- or tub shape, wherein a plurality of pin shaped protrusions or lugs or similar extensions is provided on an inside in a direction towards the fleece pad, wherein the extensions provide a firm connection between the connection cable end and/or the conductive foil and the fleece pad. Additionally, the pin shape protrusions provide an improvement of the contact formation with resultant improved current carrying capability as long as the protrusions are oriented in a direction of the contact point on the flat structure.

The contact arrangement according to the invention can be configured with one pole but can also be configured with plural poles within an encasement element, wherein plural pads made from conductive fleece material that are arranged adjacent to one another are connected in the latter case with a respective connecting cable or a group of cables.

In a multi pole variant of the contacting arrangement, a multi pole connection can be implemented with a single gluing process which has advantages over a soldering process. Through the exclusive glue joint, no thermal loading is applied to the flat structure, in particular a respective glass pane.

The cable which forms the exterior connection can be connected with the conductive fleece through crimping, wherein the encasement block additionally provides a pull relief for the cable from the actual contact portion.

BRIEF DESCRIPTION OF THE DRAWINGS

The invention is now described in more detail based on an embodiment with reference to drawing figures, wherein:

FIG. 4a illustrates a top view of the contacting arrangement arranged on a glass pane;

FIG. 4b illustrates aside view of the arrangement according to FIG. 4a;

FIG. 4c illustrates a front view with visible cables according to the illustration of FIG. 4a;

FIG. 4d illustrates a sectional view along the line A-A according to FIG. 4a;

FIG. 4e is an enlarged view of circle B according to FIG. 4d; and

FIG. 5a-5c illustrate a top view, a longitudinal view and a cross-sectional view of an embodiment with an integrated sealing lip.

DETAILED DESCRIPTION OF THE INVENTION

Figure 1:
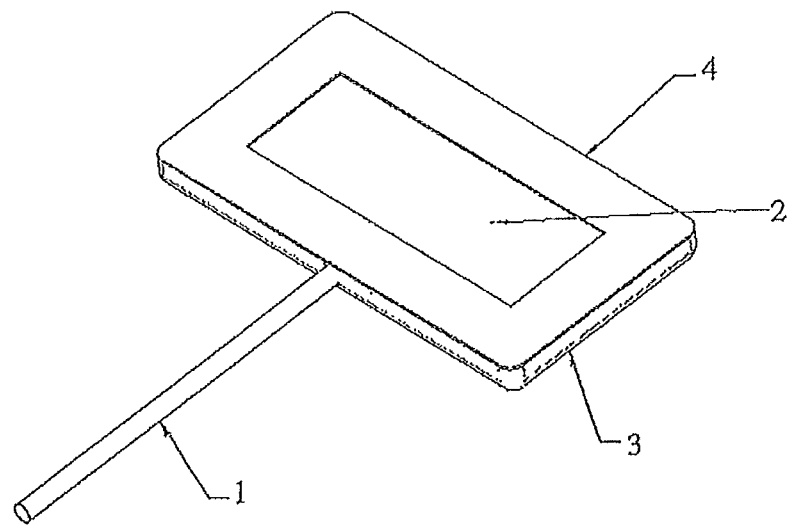
FIG. 1 illustrates a perspective view of the contacting arrangement looking at a bottom side with gluing frame and a conductive fleece pad enclosed by the gluing frame.
Figure 2:
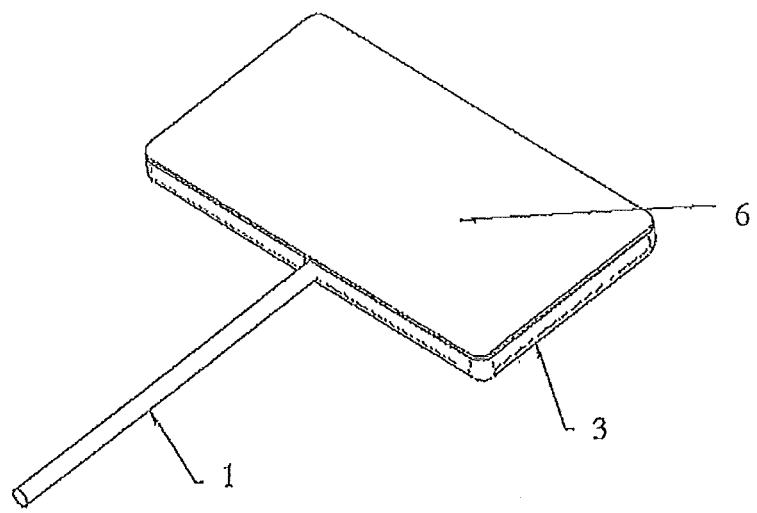
FIG. 2 is an illustration similar to FIG. 1 but with a removable coating covering the gluing frame surface.

As can be derived from the illustrations of FIGS. 1 and 2, the contacting arrangement according to the invention initially includes a connection cable 1 which can for example be configured as a strand.

This connection cable 1 is connected with an electrically conductive fleece pad 2. This connection can be provided for example by crimping or by connecting a conductive foil in between, wherein the conductive foil is contacted with a fleece material that is conductive on both sides.

Figure 4:
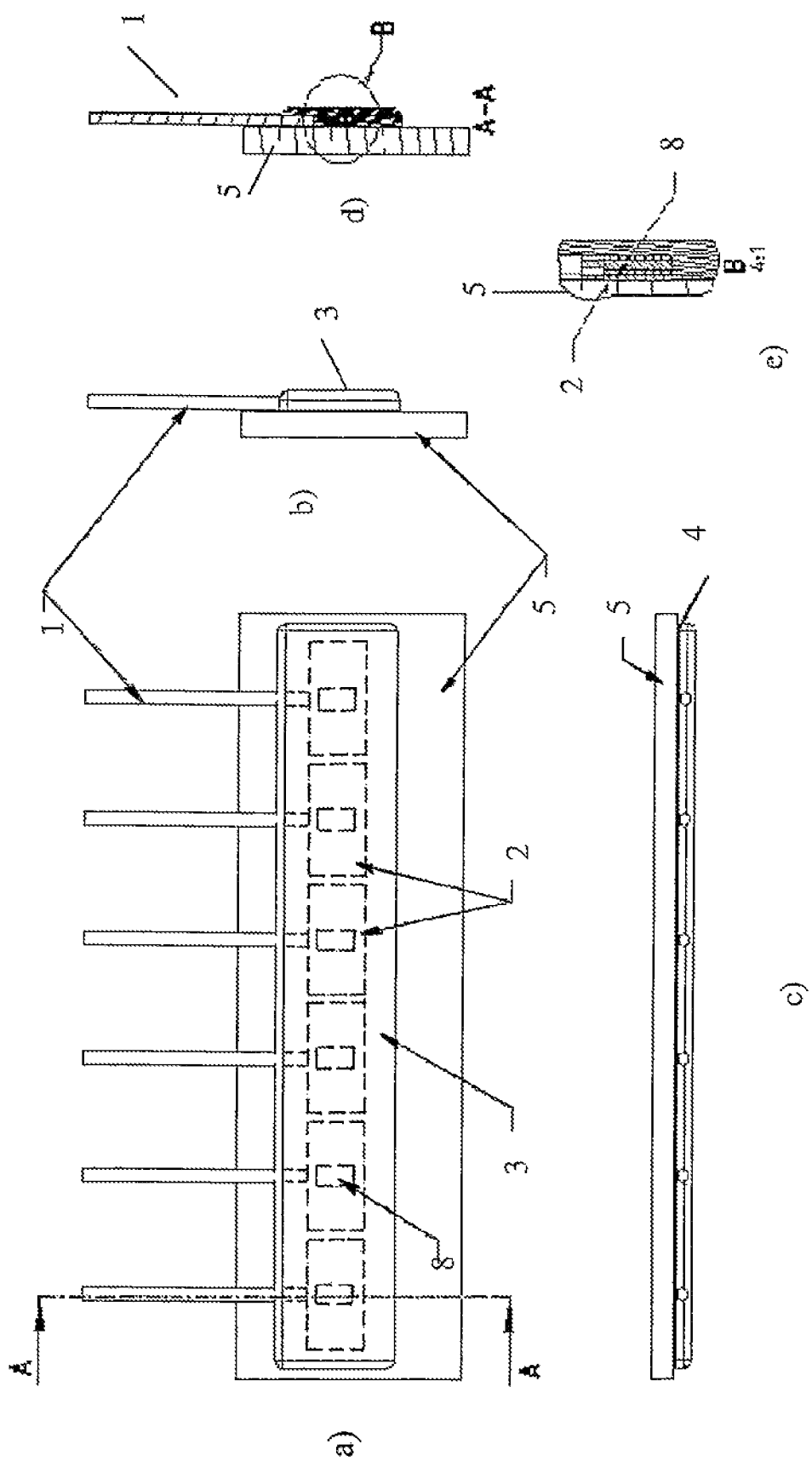

The cable is introduced into an encasement 3 which has a frame 4. The frame 4 encloses the conductive fleece 2 on all sides, however, keeps it open at the contact point on the flat structure 5 (c.f. FIG. 4).

The prefabricated and accordingly configured contacting arrangement according to FIG. 2 is covered with a protective material 6 that is configured as a release paper or release liner and is thus ready for use.

Figure 3:
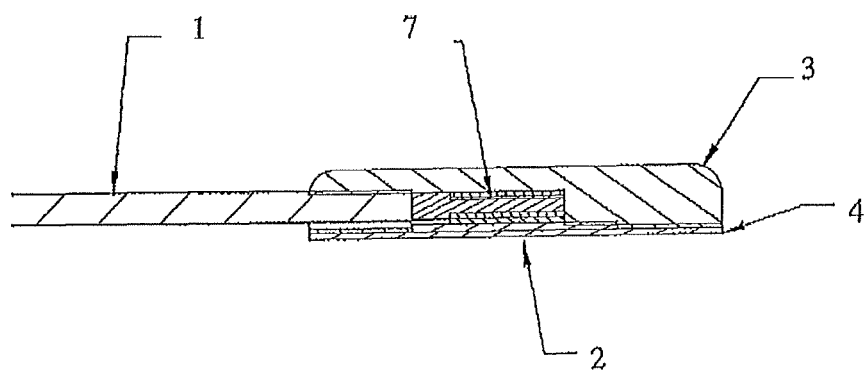
FIG. 3 is a schematic sectional view of the encasement element with the gluing frame and the conductive fleece.

The sectional view according to FIG. 3 makes additional details of the configuration of the contacting arrangement visible.

The cable 1 includes a cable crimp 7 which reaches into an interior of the encasement element and is connected therein with the electrically conductive fleece pad 2. The electrically conductive fleece pad 2 can have one or plural layers or it can also be configured with a crossover layup in order to provide the required electrical properties.

A prepared and preconfigured contacting arrangement can be configured with one pole or with plural poles as illustrated in FIG. 4, wherein each cable 1 leads to a respective fleece pad 2. The ends of the cables are inserted in strand end sleeves 8, wherein the latter are connected with the respective fleece pad.

The gluing frame 4 is used for fixating the contacting arrangement in the portion of respectively configured contact points on the glass pane 5, wherein the respective contact points of the multi-pole arrangement are tightly enclosed.

The encasement block 3 can be colored dark so that the actual contact point remains invisible. Subsequent blackening of typical soldering contacts can thus be omitted.

It is apparent from the preceding descriptions that the cables preconfigured with the fleece that glues on one side can be soldered together with a copper foil that is glued together with the fleece.

The copper foil is thus used for increasing the current carrying capability quasi alternatively to fleece variants which are made from plural layers.

The encasement leads to a desired unloading in order to protect the contact spot and yields an electrical insulation.

It is also apparent from the figures that the encasement configured as an encasement block is exposed at the bottom side in order to electrically connect the conductive fleece with a contact spot on the window pane that is applied for example through silk screening.

The electrical contact between the contact spot on the pane and the fleece pad is mostly or exclusively provided through surface pressure. If necessary, the contacting arrangement can be removed without destroying the contact spot that is actually arranged on the window pane and a new contact can be applied.

As a supplement thereto, there is the option to improve an encasement element with a tub shape so that a matrix arrangement of a plurality of pin shaped extensions or lugs is configured on the inside in a direction towards the fleece pad. When applying the encasement element thus configured to a contact location, the electrical connection is optimized even further.

The embodiment according to the illustrations according to FIGS. 5a through 5c is an encasement element variant in which a portion of the frame forms a seal lip 10.

This seal lip portion 10 forms a separation element during the subsequent mounting of the motor vehicle window pane not illustrated in the figures in order to prevent that glue, which is applied to the window pane for installing the window pane in the vehicle body from moving into the viewing area of the window pane and the conductive prints provided therein. Thus, the integrated seal lip portion 10 can make applying a separate seal strip or a seal lip redundant.

As apparent from the sectional views according to FIG. 5b or 5c, the encasement 3 is implemented through a macro-melt encasement or a similar plastic material.

A double sided conductive tape 14 is then used for contacting a conductive print 12 On the window pane and represents the electrical connection to a strand end sleeve 13 whose extension is drawn below the conductive print 12 or the double sided tape 14 in FIG. 5a.

The invention claimed is:

1. A contacting arrangement for conductors provided on flat structures, namely glass panes, the conductors having a contact point in their connecting section,
   wherein one end of a connecting cable or another connection device is electrically and mechanically connected with a pad including a conductive fleece or double-sided conductive adhesive tape,
   wherein the connecting cable configured in this way is introduced into an encasement block which is open at one side and which includes a frame which surrounds the fleece or the conductive adhesive tape and which is provided with adhesive,
   wherein the surface of the conductive fleece which is laterally defined by the frame is matched to the area of the contact point in order to provide a contact connection between the contact point and the fleece surface through an adhesive joint between the frame and the flat structure,
   wherein the frame with the encasement element closes off the contact point in sealing fashion towards the ambient and a portion of the frame functions to prevent adhesives from spreading out when the glass pane is fitted, and wherein the end of the connection cable is connected with a conductive foil on which the pad made from conductive fleece is provided.

2. A contacting arrangement for conductors provided on flat structures, namely glass panes, the conductors having a contact point in their connecting section, wherein one end of a connecting cable or another connection device is electrically and mechanically connected with a pad including a conductive fleece or double-sided conductive adhesive tape, wherein the connecting cable configured in this way is introduced into an encasement block which is open at one side and which includes a frame which surrounds the fleece or the conductive adhesive tape and which is provided with adhesive, wherein the surface of the conductive fleece which is laterally defined by the frame is matched to the area of the contact point in order to provide a contact connection between the contact point and the fleece surface through an adhesive joint between the frame and the flat structure, wherein the frame with the encasement element closes off the contact point in sealing fashion towards the ambient and a portion of the frame functions to prevent adhesives from spreading out when the glass pane is fitted, and wherein the frame has self-adhesive properties and is covered by a protective material before being glued to the flat structure.

3. A contacting arrangement for conductors provided on flat structures, namely glass panes, the conductors having a contact point in their connecting section, wherein one end of a connecting cable or another connection device is electrically and mechanically connected with a pad including a conductive fleece or double-sided conductive adhesive tape, wherein the connecting cable configured in this way is introduced into an encasement block which is open at one side and which includes a frame which surrounds the fleece or the conductive adhesive tape and which is provided with adhesive, wherein the surface of the conductive fleece which is laterally defined by the frame is matched to the area of the contact point in order to provide a contact connection between the contact point and the fleece surface through an adhesive joint between the frame and the flat structure, wherein the frame with the encasement element closes off the contact point in sealing fashion towards the ambient and a portion of the frame functions to prevent adhesives from spreading out when the glass pane is fitted, and wherein the pad is made from conductive fleece has adhesive properties on one side or non both sides.

4. The arrangement according to claim 2, wherein the protective material covers the entire surface of the encasement element that is defined by the frame.

5. A contacting arrangement for conductors provided on flat structures, namely glass panes, the conductors having a contact point in their connecting section, wherein one end of a connecting cable or another connection device is electrically and mechanically connected with a pad including a conductive fleece or double-sided conductive adhesive tape, wherein the connecting cable configured in this way is introduced into an encasement block which is open at one side and which includes a frame which surrounds the fleece or the conductive adhesive tape and which is provided with adhesive, wherein the surface of the conductive fleece which is laterally defined by the frame is matched to the area of the contact point in order to provide a contact connection between the contact point and the fleece surface through an adhesive joint between the frame and the flat structure, wherein the frame with the encasement element closes off the contact point in sealing fashion towards the ambient and a portion of the frame functions to prevent adhesives from spreading out when the glass pane is fitted, and wherein the layers are laid in a crossover pattern.

6. The arrangement according to claim 1, wherein the conductive fleece has elastic properties.

7. The arrangement according to claim 1, wherein the encasement block is colored in order to optically conceal the contact spot.

* * * * *